United States Patent [19]
Wilson et al.

[11] Patent Number: 6,118,603
[45] Date of Patent: Sep. 12, 2000

[54] DISK WITH FAULT-TOLERANT SAMPLE-DATA SERVO PATTERN

[75] Inventors: Rosser S. Wilson, Menlo Park; Michael J. Mayo, Palo Alto, both of Calif.

[73] Assignee: Syquest Technology, Inc., Fremont, Calif.

[21] Appl. No.: 08/548,366

[22] Filed: Nov. 1, 1995

[51] Int. Cl.[7] ............................... G11B 5/09; G11B 5/596
[52] U.S. Cl. ..................... 360/48; 360/77.08; 360/8.14
[58] Field of Search ........................... 360/48, 51, 77.08, 360/78.14

[56] References Cited

U.S. PATENT DOCUMENTS

| | | | |
|---|---|---|---|
| 4,459,232 | 10/1985 | Axmear et al. | 360/77.08 |
| 4,933,786 | 6/1990 | Wilson | 360/78.14 |
| 5,038,232 | 8/1991 | Grace | 360/73.03 |
| 5,255,131 | 10/1993 | Coker et al. | 360/48 |
| 5,455,721 | 10/1995 | Nemazie et al. | 360/48 |
| 5,459,623 | 10/1995 | Blagaila et al. | 360/77.08 |
| 5,760,983 | 6/1998 | Cowen | 360/77.08 |
| 5,835,303 | 11/1998 | Morehouse et al. | 360/97.01 |

OTHER PUBLICATIONS

B. McKnight, "A Track Locating Servo System Utilizing the Data Heads as Absolute Position Transducers", Jul. 1978, IEEE Transactions on Magnetics, vol. MAC–14, No. 4, pp. 182–187.

*Primary Examiner*—Paul Loomis
*Assistant Examiner*—Regina Y. Neal
*Attorney, Agent, or Firm*—Lyon & Lyon LLP

[57] ABSTRACT

A headerless, fault-tolerant sample-data servo pattern, comprising an alternating sequence of first and second servo sectors, with the first servo sectors each including a partial track address and circumferential orientation information, and the second servo sectors each including a full track address, provides an absolute indication of a read/write head's circumferential orientation along a given track on a magnetic disk which is robust in the presence of defects in the magnetic recording medium.

16 Claims, 9 Drawing Sheets

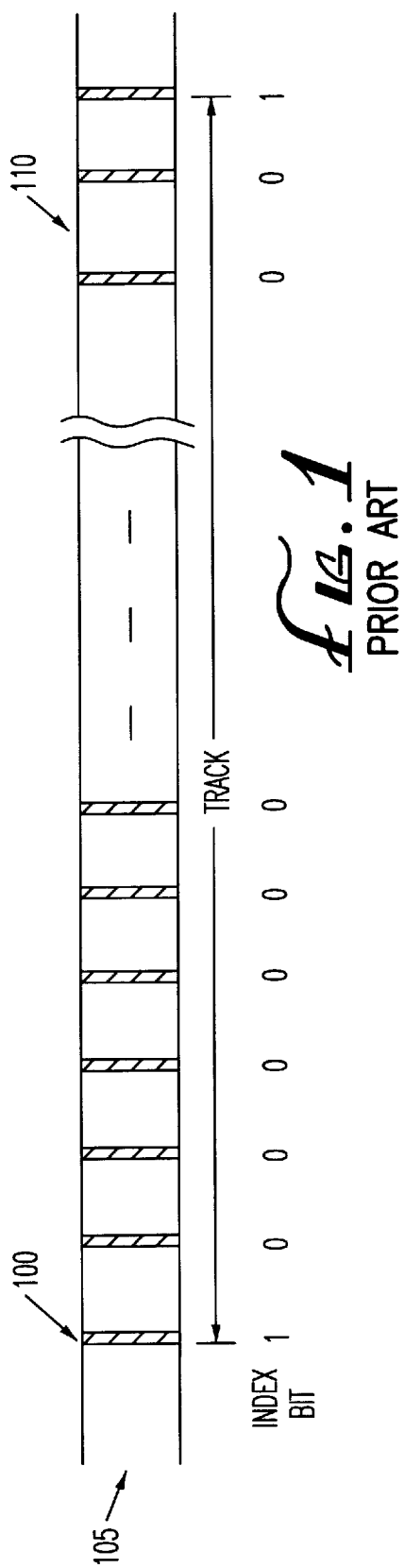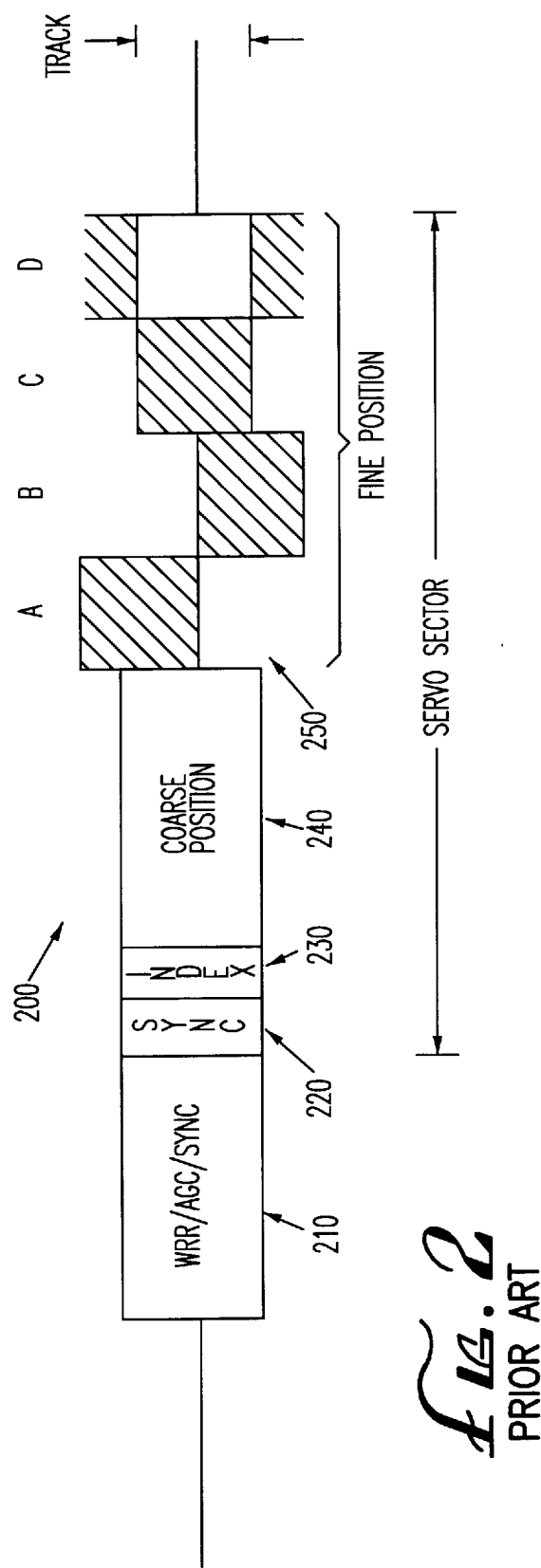

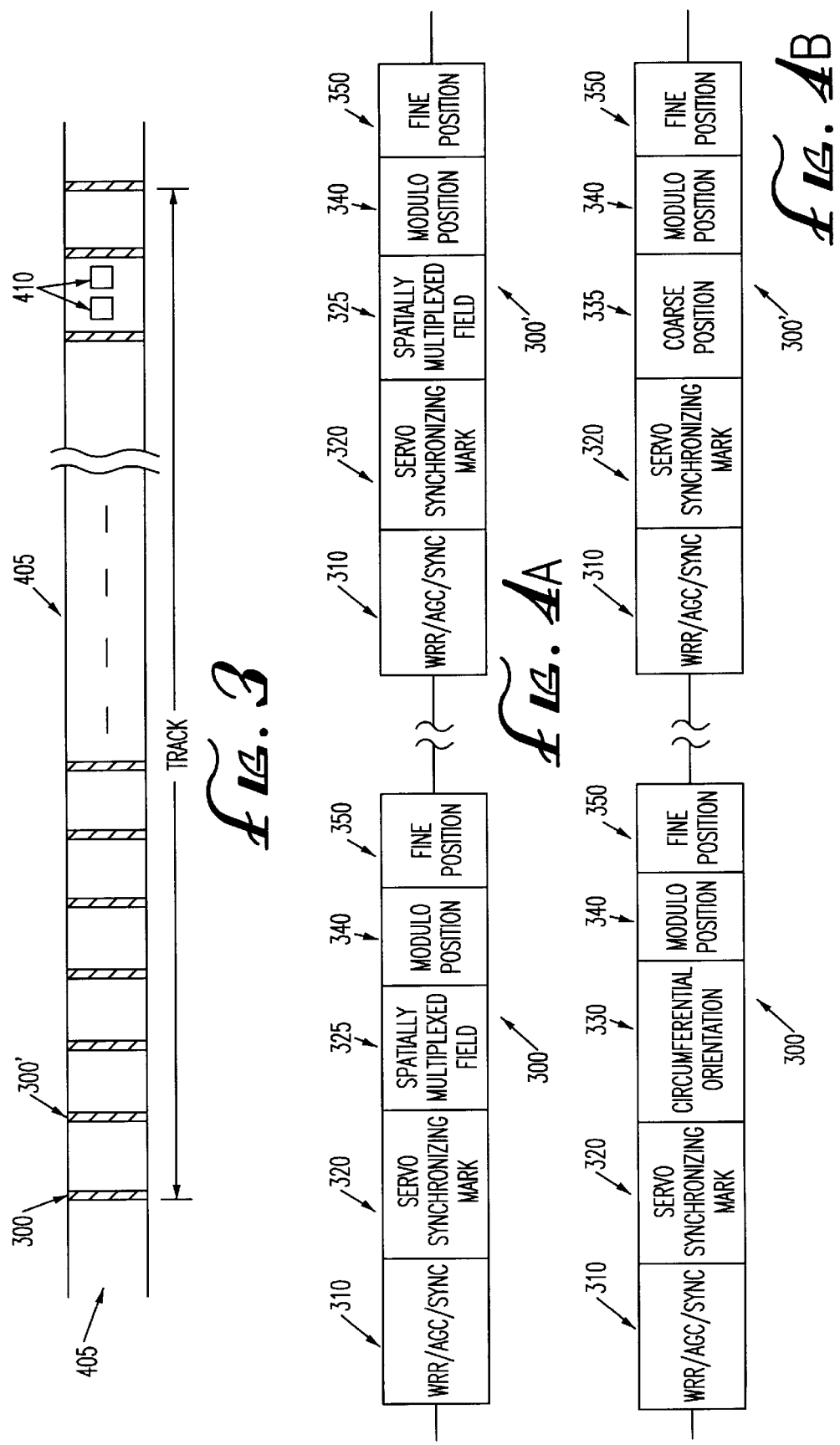

DISK WITH FAULT-TOLERANT SAMPLE-DATA SERVO PATTERN

BACKGROUND OF THE INVENTION

1) Field of the Invention

The field of the present invention relates to removable cartridge disk drives in general and, more particularly, to a method and system of encoding and decoding servo information on a removable disk cartridge.

2) Background of the Related Art

Removable cartridge disk drive systems have been available on the market for some time. Like fixed disk drives, removable cartridge disk drive systems provide large storage capacities with relatively rapid access times at low cost. However, unlike fixed disk drives, removable cartridge disk drive systems enable a user to easily replace a relatively high capacity disk, allowing for convenient exchange of large amounts of information between remote sites and for greatly increased system storage capacity.

Like fixed magnetic disk drives, removable cartridge magnetic disk drive systems use a magnetic read/write head to read and write data stored as magnetic fields on a magnetic disk surface. The disk surface is divided into a number of concentrically arranged tracks where customer data records are stored. To read or write data to the disk, the disk surface is rapidly rotated and the read/write head passes over its surface, following the circumferential path of the track or tracks where the data are to be stored or read.

For proper data storage and recovery, the read/write head must locate each track wherein data are to be written or read, and follow its path accurately along the disk surface. Thus, the disk drive requires some means of identifying tracks and of controlling the precise radial position of the read/write head so that read/write operations are performed on the desired track. Accurate read/write head location is particularly important during write operations to prevent the head from inadvertently writing over previously written data which the user wishes to keep. To accomplish this, servo position information is pre-recorded on the magnetic disk at time of manufacture, and is used by a servo system to control head motion when seeking between tracks, and to regulate head position on track when data are being written or reproduced. The servo information is preferably recorded at multiple circumferential locations, at uniform intervals on every track of the disk. Servo sections on a given track are radially contiguous with their counterparts on the adjacent tracks.

Many types of servo systems have been devised to detect and correct the alignment between the read/write head and the centerline of a track, and to provide position information to the read/write head identifying the particular track being followed. An additional component of most prior art servo patterns is an encoded bit representing track start, or index point. Aspects of some of these systems are described in:

- B. McKnight, "A Track Locating Servo System Utilizing the Data Heads as Absolute Position Transducers," IEEE Tr. Mag., Vol. Mag-14, July 1978; U.S. Pat. No. 5,255,131, entitled "Asynchronous Servo Identification/Address Mark Detection for PRML Disc Drive System;" U.S. Pat. No. 4,933,786, entitled "Fault-Tolerant Index Patterns and Decoding Means;" and U.S. Pat. No. 4,459,232, entitled "Phase Modulated Servo System."

Customer data records are recorded in the space between servo sectors. During formatting of these data, a header is initially written for each record, by the data path controller, to provide full track address and circumferential position information describing the location of the associated record. The header is used subsequently to locate and to confirm record identity prior to writing or reading the associated record. In toned-recording systems, the header may also contain information identifying the locations where data records are split around servo bursts. The header is used solely by the data path controller and is not used by the servo system.

Removable disk cartridge technology continues to advance, placing additional requirements on servo system. Track and bit area densities on magnetic disks continue to rise, yielding removable disk cartridges with the potential for greater storage capacity. To realize higher data storage capacities, servo sample rates must rise in order to achieve improved tracking at higher track densities, leading to a need for more compact, efficient servo patterns. Nevertheless, accurate read/write head position information is required in both radial and circumferential directions to prevent inadvertently writing over data previously stored on the disk.

With increased servo sector densities, and in presence of mechanical tolerances, it is possible that significant circumferential skew can exist between servo sectors served by different heads; this skew can in extreme cases exceed one servo sample interval. It is nonetheless necessary when changing heads to have an immediate indication of track position on the new head, without having to wait up to an entire disk revolution to read an index mark.

Moreover, increasing area densities leads to increasing susceptibility to servo errors due to flaws or imperfections in the recording medium. Therefore there is a need for a headerless servo sector format which can provide robust track position and circumferential orientation information to a sample-data servo system.

Another problem arises in removable cartridge disk drive systems which use rotary activators in conjunction with magneto-resistive read/write heads having separated head and write gaps. In such systems, the head may require radial repositioning between read and write operations, precluding accurate recovery prior to write of the conventionally-used header field. It is therefore desirable to dispense with the header. Omission of headers also makes more space available for storage of customer data. Consequently, it is desired to provide means, other than use of headers, of identifying the circumferential orientation of the read/write head within any given track, especially if the system has a high potential inter-head circumferential skew, and is using so-called headerless formats.

Accordingly, it would be advantageous to provide a more compact servo pattern which also supplies an absolute indication of circumferential orientation of a read/write head within a track without the use of an additional dedicated field within the servo sector to contain this circumferential information. It would further be advantageous to provide a servo pattern which is robust in the presence of flaws and imperfections in the magnetic recording medium. It would further be advantageous to provide a servo pattern comprising servo sectors which provide an indication of circumferential orientation of a read/write head to allow a sample-data servo system to instantly regain sync during head-switching operations, in presence of head skew in excess of one servo sample interval in length. Other and further objects and advantages will appear hereinafter.

SUMMARY OF THE INVENTION

The present invention comprises a system and method of encoding and decoding servo information on a removable disk cartridge in a removable cartridge disk drive system.

In one aspect of the present invention, a magnetic disk in a removable disk cartridge incorporates servo sectors which include spatially multiplexed fields which can be used to provide an absolute indication of the circumferential orientation of a read/write head within a given track on the disk without the use of a special dedicated field. The servo pattern includes a first class of servo sectors each having a Circumferential Orientation field, identifying read/write head circumferential orientation along a given track. The servo pattern also includes a second class of servo sectors each having a Coarse Position field indicating a track position within $\pm 2^k$ tracks. The Circumferential Orientation and Coarse Position information are spatially multiplexed into a common field; the contents of this common field are identified by the synchronizing mark employed to mark the onset of the servo sector.

In another aspect of the present invention, a removable disk cartridge incorporates a servo pattern including servo sectors having Circumferential Orientation fields which are radially-contiguous along a disk surface thereby eliminating the need for such information to be specially encoded in, for example, gray code. Thus, a read/write head may read Circumferential Orientation information even under a head offset condition such as with a magneto-resistive head.

In yet another aspect of the present invention, a removable cartridge disk drive incorporates a servo sector counter which may be implemented in hardware or as software, and which is incremented in response to detection of Servo Synchronizing Marks, and whose count is periodically confirmed by reading the encoded Circumferential Orientation field. The removable cartridge disk drive may derive accurate index point information from the counter immediately after head switch without need to wait for index point.

BRIEF DESCRIPTION OF THE DRAWINGS

The various objects, features and advantages of the present invention may be better understood by examining the Description of the Preferred Embodiment found below, together with the appended figures, wherein:

FIG. 1 is a diagram illustrating a prior art servo pattern comprising servo sectors recorded on a track of a magnetic disk in a removable disk cartridge.

FIG. 2 is a diagram of a prior art servo sector format for a removable disk cartridge.

FIG. 3 is a diagram illustrating an improved servo pattern organized in accordance with the present invention, comprising an alternating sequence of servo sectors with two different formats.

FIG. 4A is a diagram of servo sectors used in the improved servo pattern, identifying a spatially multiplexed field, according to one or more aspects of the present invention.

FIG. 4B is a diagram of servo sectors used in the improved servo pattern, identifying the contents of the spatially multiplexed fields of FIG. 4A.

DESCRIPTION OF THE PREFERRED EMBODIMENT

Figure 5:
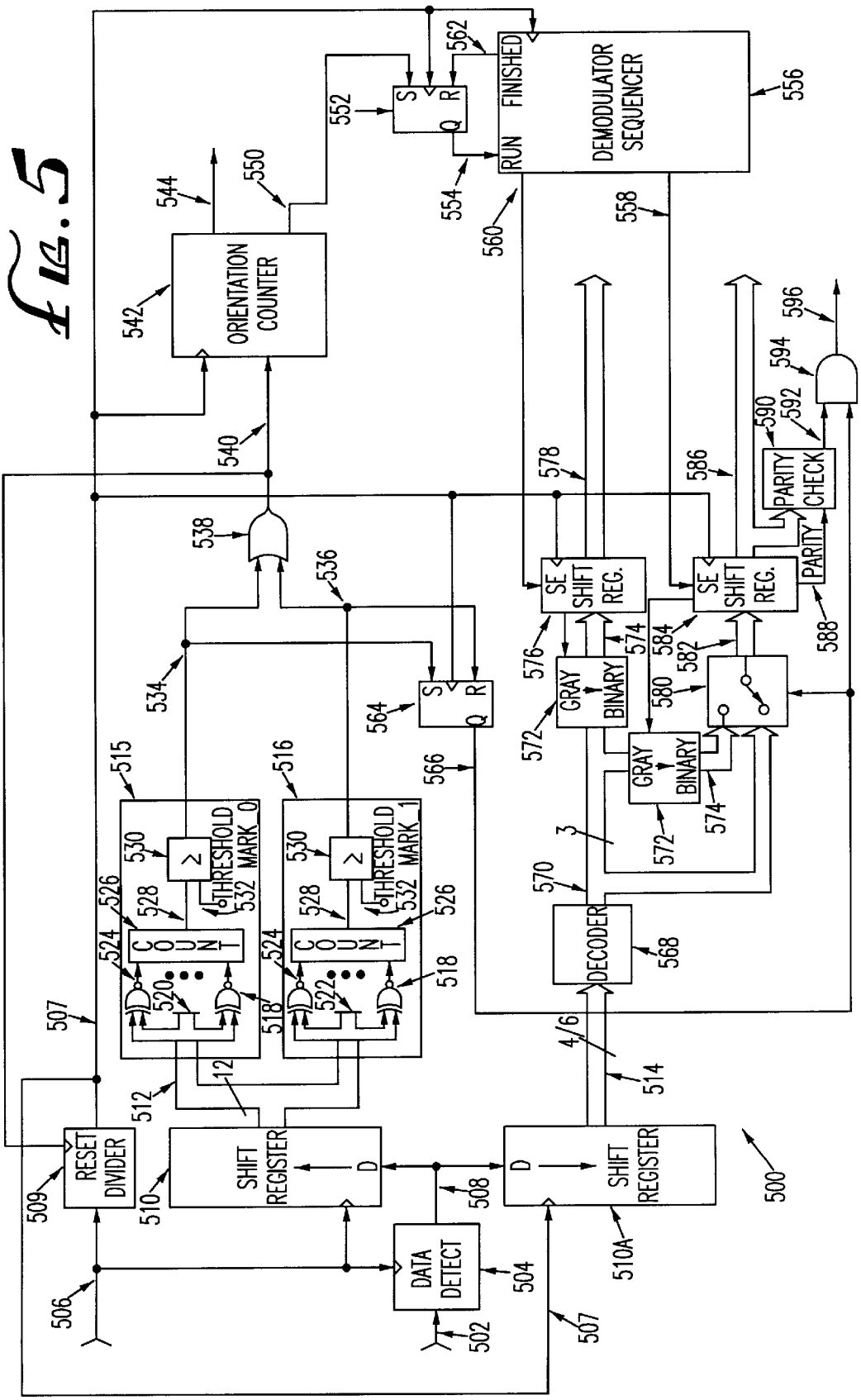
FIG. 5 is a block diagram of a servo sector detection apparatus for detecting servo information according to one or more aspects of the present invention.

FIG. 1 shows servo sectors 100 recorded on a disk of a prior art removable disk cartridge. As can be seen in FIG. 1, the servo sectors 100 appear at regularly spaced circumferential intervals around each track 105, interdigitated with user data record segments 110. Although for illustrative purposes the track segment is shown to be linear, the tracks are actually concentrically disposed on the disk's surface.

FIG. 2 shows a prior art format for a servo sector 200 for a removable cartridge disk drive system. The servo sector 200 is preceded by a Write-to-Read Recovery/AGC/Synchronization field 210. The servo sector 200 comprises a Sync field 220, (to differentiate from later usage of "Mark" field), an Index field 230, a Coarse Position field 240, and a Fine Position field 250. Typically, the Sync field 220, Index field 230, and Coarse Position field 240 each comprise a digital bit sequence. Servo sectors 200 are interleaved with user data as illustrated in FIG. 1, appearing at regularly-spaced circumferential intervals along each track. Certain zoned format systems may record multiple user data fields, each with an accompanying header, within a single servo segment. These methods may split data records around servo sectors.

The Sync field 220 is implemented typically as an erase gap violating run-length constraints of a chosen user data recording code, and possesses at least one transition upon the timing of which detection of the following servo information is based. The Sync field 220 signals onset of a servo sector 200 and is followed by an Index field 230. The Index field 230 is implemented typically as a single bit, flagging an Index servo sector typically located at the start of each track, or as a distributed pattern encoded with one bit per sector, over a small number of sectors. The Index field 230 is followed by a Coarse Position field 240.

The Coarse Position field 240 encodes a full track address for each track, using a number of bits adequate to accommodate as many tracks as are present on the disk. The Coarse Position field 240 typically encodes the track address data such that only a single bit changes between tracks. The Coarse Position field 240 may encode track address data with a Gray code which is well known in the art. Each Gray code digit is then written as a bit, as pulse-position-modulation, or in other ways well known in the art.

The Fine Position field 250 typically encodes fine position information in analog form, using any of several techniques which are well known in the art. For example, the Fine Position field 250 may contain four bursts arranged in quadrature fashion to deliver a two-phase quadrature analog position error signal (PES). This arrangement is known in the art as an ABCD burst pattern. Further details regarding techniques for encoding fine position information can be found in U.S. patent application Ser. No. 08/330,268, now U.S. Pat. No. 5,523,902 entitled "Servo Burst Pattern for Removing Offset Caused by Magnetic Distortion & Method Associated Therewith," filed Oct. 26, 1994 in the name of Richard J. Pederson and owned by the assignee of the present invention, and hereby incorporated as if fully set forth herein.

A preferred embodiment of a servo pattern according to one or more aspects of the present invention is shown in FIG. 3. Servo sectors of type 300 and 300' appear alternately at regularly spaced, circumferential intervals around each track 405 on a magnetic disk in a removable cartridge disk drive system. Servo sector types 300 and 300' are interdigitated on each track 405 with user data segments 410. User data segments 410 are preferably recorded using headerless technique known in the art, and can be split as known around servo sectors 300 or 300'. Although for illustrative purposes the segment of the track 405 is shown to be linear, tracks are actually disposed concentrically along the disk's surface.

Each track 405 includes N total servo sectors 300 and 300'. The servo sectors 300 and 300' are radially-contiguous from track to track along the surface of the magnetic disk. In a preferred embodiment, a servo pattern comprises N=120 total servo sectors 300, 300' for each track 405 on a disk in a removable cartridge disk drive system.

FIGS. 4A and 4B show the formats for servo sectors 300 and 300' which are used in an improved servo pattern according to one or more aspects of the present invention. As in the prior art, each servo sector 300 and 300' is preceded by a Write-to-Read Recovery/AGC/Synchronization field 310 (which forms no part of the present invention), a Servo Synchronizing Mark field 320, a Spatially Multiplexed field 325, a Modulo Position field 340, and a Fine Position field 350. As illustrated in FIG. 4B, the only difference between servo sectors 300 and servo sectors 300' is the content of the Spatially Multiplexed field 325. In servo sectors 300, the content of Spatially Multiplexed field 325 is a Circumferential Orientation field 330, which when associated with the specific code of servo synchronizing mark 320, carries a representation of the circumferential location of the servo sector of the track. In servo sectors 300', the content of Spatially Multiplexed field 325 is a Coarse Position field 335, which when associated with Servo Synchronizing Mark 320, contains coarse position information identifying the radial position of the head. While the preferred embodiment shows a single spatially multiplexed field 325 in which two fields are alternately interspersed (i.e., Circumferential Orientation and Coarse Position fields), it is clear that different numbers of servo data fields, containing different types of servo information can be multiplexed in a spatially multiplexed field 325.

In a preferred embodiment, the Servo Synchronizing Mark field 320, Circumferential Orientation field 330, Coarse Position field 335 and Modulo Position field 340 each comprise a digital bit sequence.

The Servo Synchronizing Mark field 320 indicates the onset of a servo sector 300 or 300'. The Servo Synchronizing Mark field 320 comprises one of two types of Servo Synchronizing Marks, denoted Mark_0 and Mark_1. Servo Synchronizing Mark_0 denotes the onset of a servo sector 300. Servo Synchronizing Mark Mark_1 denotes the onset of a servo sector 300'. The even servo sectors on each track 405 (i.e., sectors 0, 2, 4, 6 ... N−2) comprise servo sectors 300 while the odd servo sectors on each track 405 (i.e., sectors 1, 3, 5, 7 ... N−1) comprise servo sectors 300'. Thus, read/write head orientation along a track may be updated by maintaining a running count of Servo Synchronizing Marks, Mark_0 and Mark_1, detected by the read/write head.

Servo Synchronizing Marks Mark_0 and Mark_1 are chosen to have the property of strongly violating the run-length constraints of the selected channel code used for encoding data on the disk. The Servo Synchronizing Marks are also chosen to have both an adequate peak-to-sidelobe autocorrelation difference when affixed to the Write-to-Read Recovery/AGC/Synchronization field 310 to ensure detectability in the presence of medium defects, and to have minimal mutual cross-correlation.

In a preferred embodiment, Servo Synchronizing Marks Mark_0 and Mark_1 are 12-bit characters which confer detectability in the presence of two random errors. In a preferred embodiment, the Servo Synchronizing Marks are:

Mark_0=001100000101(305 hex)

Mark_1=000001101011(06B hex)

These selections are not the only ones possible, but they exhibit a maximum autocorrelation sidelobe height of seven, enabling detection in the presence of two random errors. An N-bit character can be detected in presence of k bits in error, if $N-V \geq 2k+1$, where V is the maximum value of the autocorrelation sidelobe. Hence, N=12, k=2, and N−V=5.

Additional special Servo Synchronizing Marks may be used to indicate the first and second servo sectors at the start of each track, or to encode other information. Many such choices are possible without departing from the spirit and scope of the present invention.

Servo sectors 300 include the Circumferential Orientation field 330, encoded with information identifying the circumferential location of the servo sector. The Circumferential Orientation field 330 contains a Circumferential Index. The first servo sector 300 in the track 405 contains a Circumferential Orientation value of zero. The value of the Circumferential Orientation is incremented by one in each successive Circumferential Orientation field 330 in each servo sector 300 in the track 405. Thus, the Circumferential Orientation field 330 provides an absolute indication of circumferential orientation, which may be used to complement, and provide an additional check on a servo sector count derived from detection and counting of Servo Synchronizing Marks.

In a preferred embodiment, the Circumferential Orientation field 330 has nine (9) bits, including an odd parity bit to provide enhanced detection reliability. Because only six bits are required to support a combined total of 120 servo sectors 300 and 300', ($2 \times 2^6 < 120$), two additional bits are available in addition to the parity bit. These two bits are preferably assigned to encode a binary representation of head number; this supports up to four heads.

The Circumferential Orientation fields 330 are radially-contiguous from track to track on the disk. The information in each Circumferential Orientation field therefore can be read even under a head offset condition such as might occur with a magneto-resistive read/write head, when the head is positioned to perform a write operation.

Servo sectors 300' include the Coarse Position field 335. The Coarse Position field 335 identifies the absolute track position within $\pm 2^{k-1}$ tracks. Thus, combined with the Modulo Position field 340, the Coarse Position field 335 in a servo sector 300' provides a full track address.

In a preferred embodiment, the Coarse Position field 335 comprises 9 bits coded in conventional Gray code fashion.

Servo sectors 300 and 300' each incorporate the Modulo Position field 340 which provides relative track position information. The Modulo Position field 340 comprises k bits, identifying the relative position of track 405 within the $\pm 2^{k-1}$ absolute track position indicated in the Coarse Position field 335 of servo sector 300'. The variable k is selected to be sufficiently large such that any residual errors in the state estimates of the control law in a servo-control system in a removable cartridge disk drive due to un-modelled drive dynamics and parametric tolerances are significantly less than $2^{k-1}$ tracks. (G. F. Franklin & J. D. Powell, Digital Control of Dynamic Systems, Addison & Wesley, 1980)

In a preferred embodiment, k=6 corresponding to modulo-64 operation. In that case, the Coarse Position field 335 identifies absolute track position within ±32 tracks. Prior to recording on the disk, the contents of Modulo Position, Coarse Position, and Circumferential Position fields are subject to RLL encoding whereby three bits are mapped to four bits in such a way as to preserve the unit distance property of Gray code. This encoding eliminates undesirable long runs of no transitions on the disk. Alternatively, pulse position (ppm) encoding may be employed to assign to each bit two time slots; a transition is recorded in a corresponding slot to signify a "1" or "0". The effects of either encoding are undone in the Servo Detection process.

Servo sectors 300 and 300' each incorporate the Fine Position field 350 which provides additional position error signals to a servo loop in the removable cartridge disk drive system. The Fine Position field 350 may encode fine position information, using any of several techniques as are well known in the art. In a preferred embodiment, the Fine Position field 350 uses four, six, or eight bursts arranged in quadrature fashion to deliver a multi-phase quadrature analog position error signal to the servo loop, as described in U.S. patent application Ser. No. 08/330,268 entitled, now U.S. Pat. No. 5,523,902, "Servo Burst Pattern for Removing Offset Caused by Magnetic Distortion & Method Associated Therewith." Furthermore, operating in the servo control processor combines fine position and modulo position to form a global representation of head position. Cycle resolution of modulo position is achieved using the star estimator, which is periodically checked against the Coarse Position field.

FIG. 5 shows a preferred embodiment of a servo sector detection apparatus 500 for detecting servo sectors 300 and 300'.

In the embodiment of FIG. 5, a read data signal 502 is provided to a data detector 504 in a servo sector detection apparatus 500. The read data signal 502 is a peak-detected, digitized signal which originates from the disk drive recording channel, which includes a read/write head for scanning a disk in a removable cartridge disk drive system. The data detector 504 also receives a clock signal 506 of frequency higher than the expected transition rate on wire 502. For example, the clock frequency can be 50 MHz and the transition frequency can be 50 MHz/4. In response to read data signal 502, data detector 504 produces a synchronized serial servo data signal 508 representing in binary digital form the reproduced information from the digital fields of a servo sector.

The serial servo data signal 508 is provided to a special shift register 510 which is, in a preferred embodiment, a multiple of 12 bits in length to accommodate a 12-bit Servo Synchronizing Mark. The shift register 510 generates a parallel data signal 512, which is applied to two mark detectors 515 and 516. Clock signal 506 is also provided to a frequency divider 509 yielding a divided clock signal 507 which pulses at one-sixth the rate of signal 506 in a preferred embodiment of the present invention. Divided clock signal 507 is applied to a six-bit shift register 510A. Outputs of shift register 510A form a parallel four or six-bit position data signal 514.

In a first preferred embodiment, the parallel position data signal 514 is four (4) bits wide corresponding to an embodiment wherein the Circumferential Orientation field 330, Coarse Position field 335, and Modulo Position field 340 of servo sectors 300 and 300' are encoded with a 4/3 run-length-limited (RLL) code as discussed above. The 4/3 RLL code is a fixed length block code; it is decoded by mapping the least significant four bits of shift register 510A into three bits.

In a second preferred embodiment, the parallel position data signal 514 is six (6) bits wide corresponding to an embodiment wherein the Circumferential Orientation field 330, Coarse Position field 335, and Modulo Position field 340 are each encoded with pulse position modulation (PPM) as discussed above.

The parallel servo data signal 512 is provided to majority vote circuits 515 and 516 which detect, respectively, Mark_0 and Mark_1 characters. Each majority vote circuit 515 and 516 comprises a bit-wise cascade of XNOR comparators 518 which compares the parallel servo data signal 512 to a bit pattern corresponding to the Servo Synchronizing Mark to be detected.

In a preferred embodiment, the mark detectors 515 and 516 search for a specific M-bit (M=12 in one implementation) pattern in the incoming data stream. Each incoming bit occupies a specific number N (six in one implementation) of cycles of clock 506. The mark detect shift register 510 comprises M*N individual flip flops, and is clocked at N times the rate of clock 507. Each group of N flip flops is associated with a single bit in the mark pattern, and each group is examined individually and in parallel for the occurrence of the 'all zeroes' state, or of the 'single one' state. These states correspond respectively to '0' and '1' in the specific mark pattern. A tally is maintained of the number of groups having states agreeing with the associated mark character bits. When this tally first exceeds the mark voting threshold, a mark found signal is produced.

In a preferred embodiment, majority vote circuit 515 includes a first bit pattern generating means 520 which generates a bit pattern comprising the sequence 001100000101 (305 hex). Majority vote circuit 516 includes a second bit pattern generating means 522 which generates a bit pattern comprising the sequence 000001101011 (06B hex). The first and second bit pattern generating means 520 and 522 may each comprise a bit register or a latch, or the inputs to the bit-wise cascades of XNOR comparators may be directly tied to appropriate supply voltages. Other embodiments are possible and considered within the scope of the present invention, as is the specific choice of the bit patterns being detected.

Each XNOR comparator 518 produces a mark bit comparison signal 524 which indicates whether a bit match has occurred. Mark bit comparison signals 524 are provided to an adder circuit 526 in each majority vote circuit 515 and 516 which sums the number of bit matches to produce a mark match count signal 528. The mark match count signal 528 thus comprises a value equal to the number of bits in the parallel servo data signal which match the bit pattern.

The mark match count signal 528 is provided to a magnitude comparator 530 which is also provided with a detection threshold 532. Magnitude comparator 530 in each majority vote circuit 515 and 516 compares the mark match count signal 528 with the detection threshold 532 to provide an output signal indicating detection of a Servo Synchronizing Mark when its input 528 is greater than input 532. Majority vote circuit 515 provides a Mark_0 detect signal 534 and majority vote circuit 516 provides a Mark_1 detect signal 536. Blocks 515 and 516 thus form digital correlator circuits.

In a preferred embodiment, the detection threshold 532 for majority vote circuits 515 and 516 is equal to nine (9), but may be set also to other values to achieve varying detection thresholds.

The Mark_0 detect signal 534 and Mark_1 detect signal 536 are provided to an OR gate 538 to generate a servo sector detect signal 540. Servo sector detect signal 540 is also applied to divider 509 to reset it so that checking of bursts timed by clock 507 are at a fixed time relative to the Servo Synchronizing Mark 320. The servo sector detect signal 540 and the divided clock signal 507 are provided to an Orientation Counter 542. The purpose of the orientation counter is to time events that occur in other sections of the drive, within a servo segment interval, and to provide a noise-rejection window in which searches are conducted for Mark_0 and Mark_1 characters.

Figure 6:
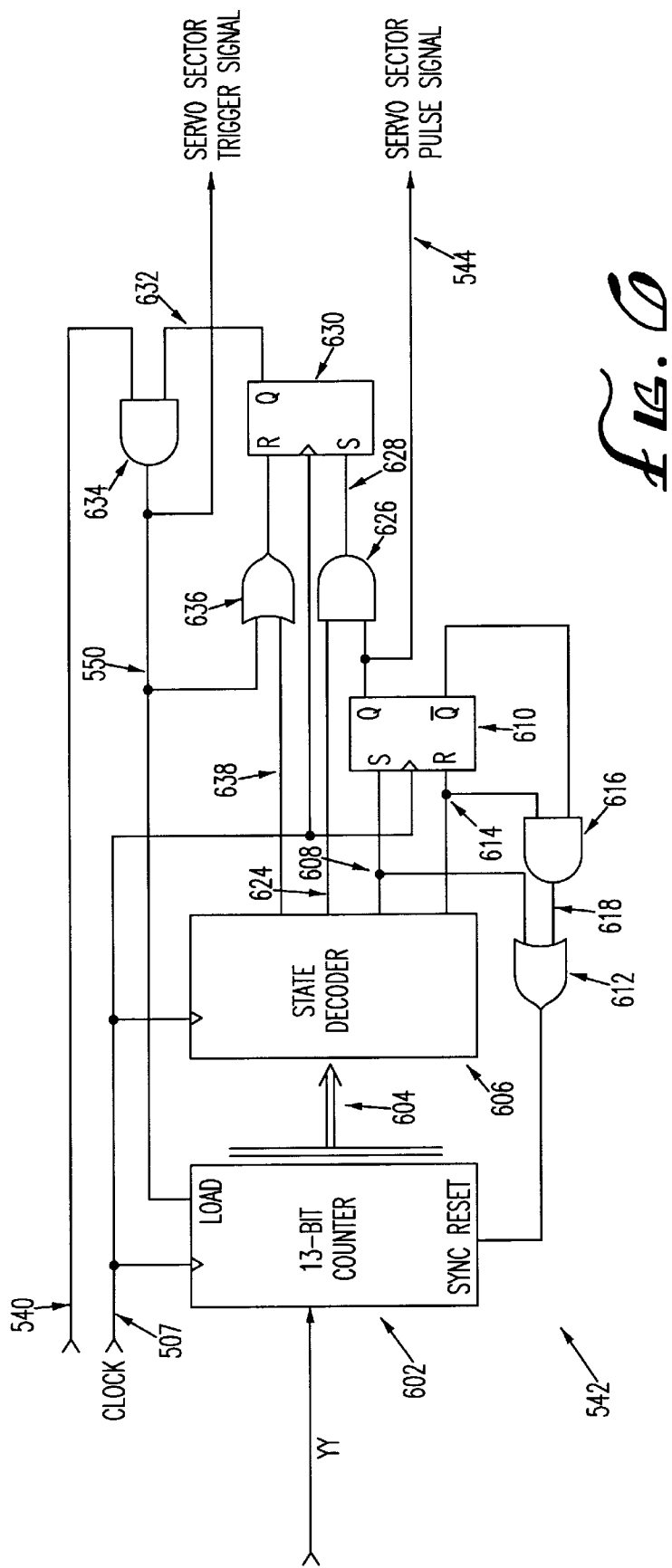
FIG. 6 is a diagram of timing signals associated with the servo sector detection apparatus of FIG. 5.
Figure 7:
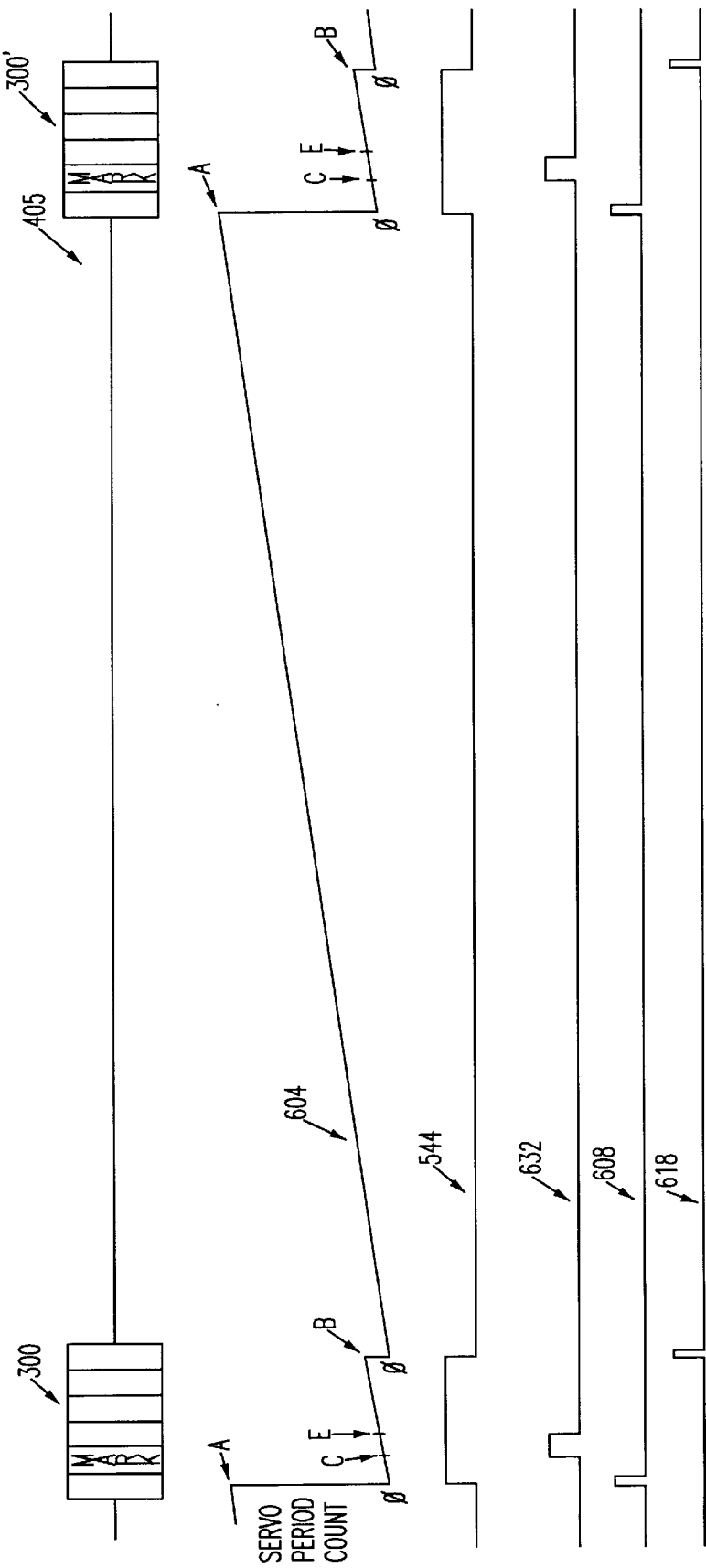
FIG. 7 shows operation of the orientation counter of FIG. 5.

A preferred embodiment of Orientation Counter 542 is shown in FIG. 6. Related wave forms appear in FIG. 7. The Orientation Counter 542 comprises a 13-bit servo period binary counter 602 which receives the clock signal 507 and produces a servo period count signal 604, as illustrated in FIG. 7. The servo period count signal 604 is provided to a state decoder 606. In response to the clock signal 507, the servo period counter 602 increments the count of the servo period count signal 604.

For full programmability, counts A, B, C, D in FIG. 7, are made programmable through configuration registers (not shown). In response to decoding a count of A, which corresponds to the expected number of clock cycles between consecutive servo sectors 300, 300', the state decoder 606 produces a positive transition in an A-count detect signal 608 as shown in FIG. 7. The A-count detect signal 608 is coupled to the set input of a synchronous flip-flop 610. Upon the next cycle of the clock signal 507, the Q output of the flip-flop 610 goes high to produce a pulse in a servo sector pulse signal 544 as shown in FIG. 7. Each pulse in the servo sector pulse signal 544 indicates an expected time period for detection of a servo sector 300, 300'. The servo sector pulse signal 544 is provided as an output from the Orientation Counter 542, for use in data formatting operations on the disk.

The A-count detect signal 608 is also provided to an OR gate 612, whose output is coupled to a synchronous reset input of the servo period counter 602. In response to the positive level on in the A-count detect signal 608, the servo period counter 602 is reset to zero. The servo period counter 602 then begins to increment its count again as shown in FIG. 7. The servo period counter 602 counts up to a count of B corresponding to the expected number of clock cycles which define the period of each servo sector 300, 300'.

Upon detecting a count of B, the state decoder 606 produces a positive-going level in a B-count detect signal 614. The B-count detect signal 614 is coupled to a first input of an AND gate 616. A $\overline{Q}$ output of the flip-flop 610 is provided to the other input of the AND gate 616. The AND gate 616 provides a B-count reset signal 618 to the OR gate 612. In response to detection of the count B signifying the end of an expected servo sector period, the B-count reset signal 618 exhibits a positive level as shown in FIG. 7. The positive level on the B-count reset signal 618 in turn synchronously resets the servo period counter 602. Upon the next clock cycle after being reset to zero, the servo period counter 602 again begins to count up to A, corresponding to the expected number of clock cycles between consecutive servo bursts 300, 300', thus beginning the cycle over once more.

The B-count detect signal 614 is also coupled to the reset input of the synchronous S-R flip-flop 610. Upon the next cycle of the clock signal 507, the $\overline{Q}$ output of the flip-flop 610 goes low to terminate the servo detect pulse in the servo sector pulse signal 544. Thus the Orientation Counter 542 produces a servo sector pulse signal 544 having a pulse for each expected servo sector 300, 300'.

During each pulse in the servo sector pulse signal 544, the state decoder 606 decodes a count of C, corresponding to the number of clock cycles just prior to the expected time for detecting the next Servo Synchronizing Mark. In response to decoding a count of C, the state decoder 606 produces a positive transition in a C-count detect signal 624. The C-count detect signal 624 is coupled to an AND gate 626. The other input of the AND gate 626 is the servo sector pulse signal 544.

The AND gate 626 produces a mark window set signal 628 which is coupled to the set input of a synchronous flip-flop 630. This flip-flop generates a noise-rejection window which brackets the ideal time-of-arrival of mark pulses delivered on Wire 540. The AND gate 626 produces a positive level in the mark window set signal 628 in response to a the C-count detect signal 624 being high during the period of servo sectors 300, 300'. Upon the next cycle of the clock signal 507, the Q output of the flip-flop 630 goes high to produce a pulse in a mark window pulse signal 632. Each pulse in the mark window pulse signal 632 indicates an expected time period for detection of a Servo Synchronizing Mark.

The Orientation Counter of FIG. 6 is periodically synchronized with the detection of the Mark_0 and Mark_1 pulses of a servo sector 300, 300' in response to the servo sector detect or mark detect signal 540. The servo sector detect signal 540 and the mark window pulse signal 632 are each provided to an AND gate 634 which generates a servo sector trigger signal 550. The servo sector trigger signal 550 synchronously pre-loads the servo period counter 602 with a number D, slightly greater than C, corresponding to the number of clock cycles for the expected time of detection of a Servo Synchronizing Mark, as copied relative to Point A. This pre-load value is delivered to counter 602 on wire YY.

The servo sector trigger signal 550 is also coupled to an OR gate 636 whose output resets the flip-flop 630 to terminate the pulse in the mark window pulse signal 632. The other input of the OR gate 636 is provided from an E-count detect signal 638 from the state decoder 606. Upon the servo counter 602 reaching a count of E, corresponding to an expected end of a Servo Synchronizing Mark Window, the state decoder 606 produces a positive level in the E-count detect signal 638 which synchronously resets the flip-flop 630 to terminate the pulse in the mark window pulse signal 632 as shown in FIG. 7. It should be apparent that if no mark is detected in a particular servo sector, perhaps because of a surface flaw on the magnetic disk, then the Orientation Counter will coast over the missing mark. As such, the counter serves also to interpolate missing servo sectors.

Thus Orientation Counter 542 opens a timing window for detection of a Servo Synchronizing Mark in a servo sector 300, 300' of duration equal to (E-C) multiplied by the period of the clock signal 506. In a preferred embodiment, where the clock signal 507 is 50 MHz, then C may equal 200 and E may equal 300, corresponding to a time period of from 4 μsec. to 6 μsec. after start of a servo sector. In such a case, D may equal 80, corresponding to a nominal expected time for detection of a Servo Synchronizing Mark of 5 μsec. after the start of a servo sector, and the value supplied on line yy to counter 602 would be 250.

In a preferred embodiment, B equals 750, corresponding to a servo sector period of 15 μsec. duration, and A equals 4250, corresponding to an expected period between successive servo sectors of 85 μsec.

Turning again to FIG. 5, the Orientation Counter 542 also provides the servo sector trigger signal 550 as an output signal to supply timing for circuits in the servo sector detection apparatus 500. The servo sector trigger signal 550 sets a flip-flop 552 to produce a pulse in a run sequencer signal 554, as shown in FIG. 7. The run sequencer signal 554 and the clock signal 507 are each provided to a Demodulator Sequencer 556.

Figure 8:
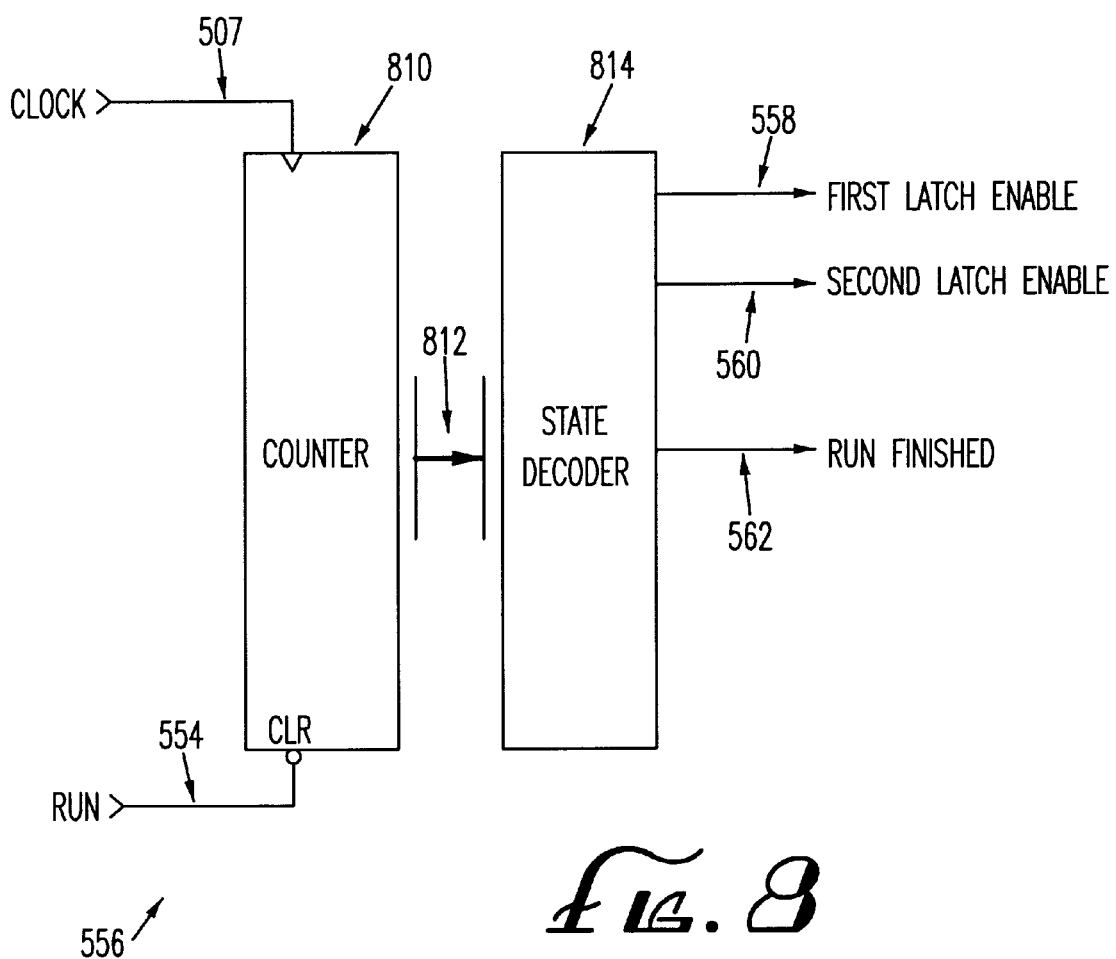
FIG. 8 shows schematically the Demodulator Sequence of FIG. 5.

FIG. 8 shows a preferred embodiment of a Demodulator Sequencer 556, which is a simple counter-based state machine. In response to a high level on the run sequencer signal 554, a counter 810 in the Demodulator Sequencer 556 begins to count clock cycles. The counter 810 provides a count output signal 812 to a state decoder 814.

In a preferred embodiment, upon reaching a count of $X_1$ (4 RLL or 6 ppm), corresponding to the number of divided clock signal 507 cycles between the initial rise of the run sequencer signal 554 (signifying the end of the Servo Synchronizing Mark 320) and the third bit of Spatially Multiplexed field 325, the state decoder 814 produces a first pulse in a latch enable signal 558. Next, upon reaching a count of $X_2$ (8 RLL or 12 ppm), corresponding to the number of divided clock signal 507 cycles between the pulse in the run sequencer signal 554 and the sixth bit of the Spatially Multiplexed field 325, the State decoder 814 produces a second pulse in the latch enable signal 558. This pulse governs operation of shift register 584, which deserializes the contents of the Spatially Multiplexed field 325 of servo sectors 300 and 300'.

Similarly, upon reaching counts of $Y_1$, $Y_2$, and $Y_3$ (12 RLL/18 ppm, 16 RLL/24 ppm, and 20 RLL/30 ppm) corresponding to the number of divided clock signal 507 cycles between the pulse in the run sequencer signal 554 and the third, sixth, and ninth bits respectively of the Modulo Position field 340, the state decoder 814 produces a first, second, and third pulse respectively in a latch enable signal 560. This pulse governs operation of shift register 576, which deserializes the contents of the Modulo Position field of servo sectors 300 and 300'.

The Demodulator Sequencer 556 continues counting clock cycles until it reaches a number Z, corresponding to the number of clock cycles occurring in the period for servo sector 300, 300'. When the Demodulator Sequencer 556 has finished counting Z clock cycles, it triggers a run finished signal 562 which resets flip-flop 552. This, in turn, terminates the pulse in the run sequencer signal 554, thus terminating further counting by the Demodulator Sequencer 556 until a next servo sector 300, 300' is detected. The Demodulator Sequencer 556 also may provide other gating signals (QQ) to the circuits detecting the Fine Position field bursts 350.

Turning again to FIG. 5, the Mark_0 detect signal 534 and the Mark_1 detect signal 536 are each provided to a synchronous S-R flip-flop 564 to generate a mode selection signal 566. The Mark_0 detect signal 534 is connected to the set input of the flip-flop 564 and sets the mode selection signal 566 whenever a Mark_0 is detected. Similarly, the Mark_1 detect signal 536 is connected to the reset input of the flip-flop 564 and resets the mode selection signal 566 whenever a Mark_1 is detected. The signal on Wire 566 is also applied to the controlling processor, so it can properly interpret the contents of the Circumferential Orientation and Modulo Position fields as presented on buss 586.

The parallel position data signal 514 is provided to a modulation code decoder 568. In a preferred embodiment, the decoder 568 is programmable to decode either RLL or PPM encoded data signals. In such a case, the determination as to whether the decoder 568 performs RLL or PPM decoding may be made at power-up in response, for example, to a number stored in an internal register in a removable cartridge disk drive. This is consistent with programmability disclosed in connection with other circuits described above.

A truth table for a preferred embodiment of decoder 568 is shown in Table 1. The table can be implemented in PLA or discrete gates.

TABLE 1

| OUTPUT | RLL INPUT | PPM INPUT |
| --- | --- | --- |
| 000 | 1001 | 101010 |
| 001 | 1101 | 101001 |
| 011 | 0101 | 100101 |
| 010 | 0111 | 100110 |
| 110 | 1111 | 010110 |
| 111 | 1110 | 010101 |
| 101 | 1010 | 011001 |
| 100 | 1011 | 011010 |

The decoder 568 decodes the parallel position data signal 514 to generate a parallel decoded position data signal 570. The parallel decoded position data signal 570 is provided to serial Gray code-to-binary convertors 572, such as is well known in the art. The Gray code converters decode the parallel decoded position data signal into binary form and generate parallel track position data signals 574. In a preferred embodiment, the decoder 568 decodes three bits at a time such that the parallel decoded position data signal 570 and the parallel track position data signal 574 are each three (3) bits wide. Feedback is obtained from registers 576 and 584, to enable serial conversion from Gray to binary code. Framing of the data in shift registers 576 and 584 is inherent in the timing of clock 507 with respect to mark detection. This is forced by reset of clock 509.

The parallel track position data signal 574 is provided to a first shift register 576. The first shift register 576 also receives the latch enable signal 560 from the demodulator sequencer 556.

In a preferred embodiment, the first shift register 576 is three bits wide by two bits long to latch a Modulo Position field 340 comprising six (6) bits. In response to each pulse in the latch enable signal 560, the first shift register 576 latches three data bits from the parallel track position data signal 574, corresponding to three bits from a Modulo Position field 340 in a servo sector 300, 300'. The first register 576 outputs a Modulo Position signal 578 which may be provided on a signal bus to be read by a digital signal processor or microprocessor in the removable cartridge disk drive.

The parallel track position data signal 574 and the parallel decoded position data signal 570 are also each provided to a mode selector switch 580. The mode selector switch 580 also receives the mode selection signal 566. In response to the mode selection signal 566 being set, indicating detection of a Servo Synchronizing Mark Mark_0, the mode selector switch 580 provides the parallel decoded position data signal 570 as an output multiplexed signal 582. This corresponds to detection of a servo sector 300 including a Circumferential Orientation field 330 containing a servo sector number which, as mentioned before, is not Gray coded.

On the other hand, in response to the mode selection signal 566 being reset, indicating detection of a Servo Synchronizing Mark Mark_1, the mode selection switch 580 provides the parallel track position data signal 574 as an output multiplexed signal 582. This corresponds to detection of a servo sector 300' including a Coarse Position field 335 containing an indication of track address which, as mentioned before, is preferably Gray coded.

The multiplexed signal 582 is provided to a second shift register 584. The second shift register 584 also receives the shift enable signal 558 from the demodulator sequencer 556.

In a preferred embodiment, the second shift register 584 is three bits wide by three bits long to latch a Coarse Position field 335 and a Circumferential Orientation field 330 each comprising nine (9) bits. In that case, the multiplexed Coarse Position/Circumferential Orientation signal 586 is eight (8) bits wide. In response to each pulse in the latch enable signal 558, the second shift register 584 latches three data bits from the multiplexed signal 582, corresponding to a Circumferential Orientation field 330 or a Coarse Position field 335 respectively in servo sectors 300, 300'.

The second shift register 584 outputs a multiplexed Coarse Position/Circumferential Orientation signal 586 which may be provided on a signal bus to be read by a digital signal processor or microprocessor in the removable cartridge disk drive. The second shift register 584 also outputs a parity bit signal 588 comprising a parity bit from the Circumferential Orientation field 330 when the Circumferential Orientation field has been detected.

The multiplexed Coarse Position/Circumferential Orientation signal 586 and the parity check signal 588 are provided to a parity checker 590 which checks the parity bit in a Circumferential Orientation field 330. The parity checker 590 generates a servo sector number good signal 592, which indicates whether the multiplexed Coarse Position/Circumferential Orientation signal 586 passed the parity check. The servo sector number good signal 592 and the mode selection signal 566 are provided to an AND gate 594. The AND gate 594 generates a servo sector number valid signal 596 which indicates the detection of a valid servo sector number from a Circumferential Orientation field 330.

Thus the servo sector number valid signal 596 and the multiplexed Coarse Position/Circumferential Orientation signal 586 may be used by an index detection circuit in a removable cartridge disk drive to verify read/write head circumferential orientation along a particular track 405. An additional measure of validity embodied in preferred implementation detects presentation to RLL/PPM Decoder 568 of illegal codes, i.e., any of the eight input combinations not tabulated in Table 1.

Figure 9:
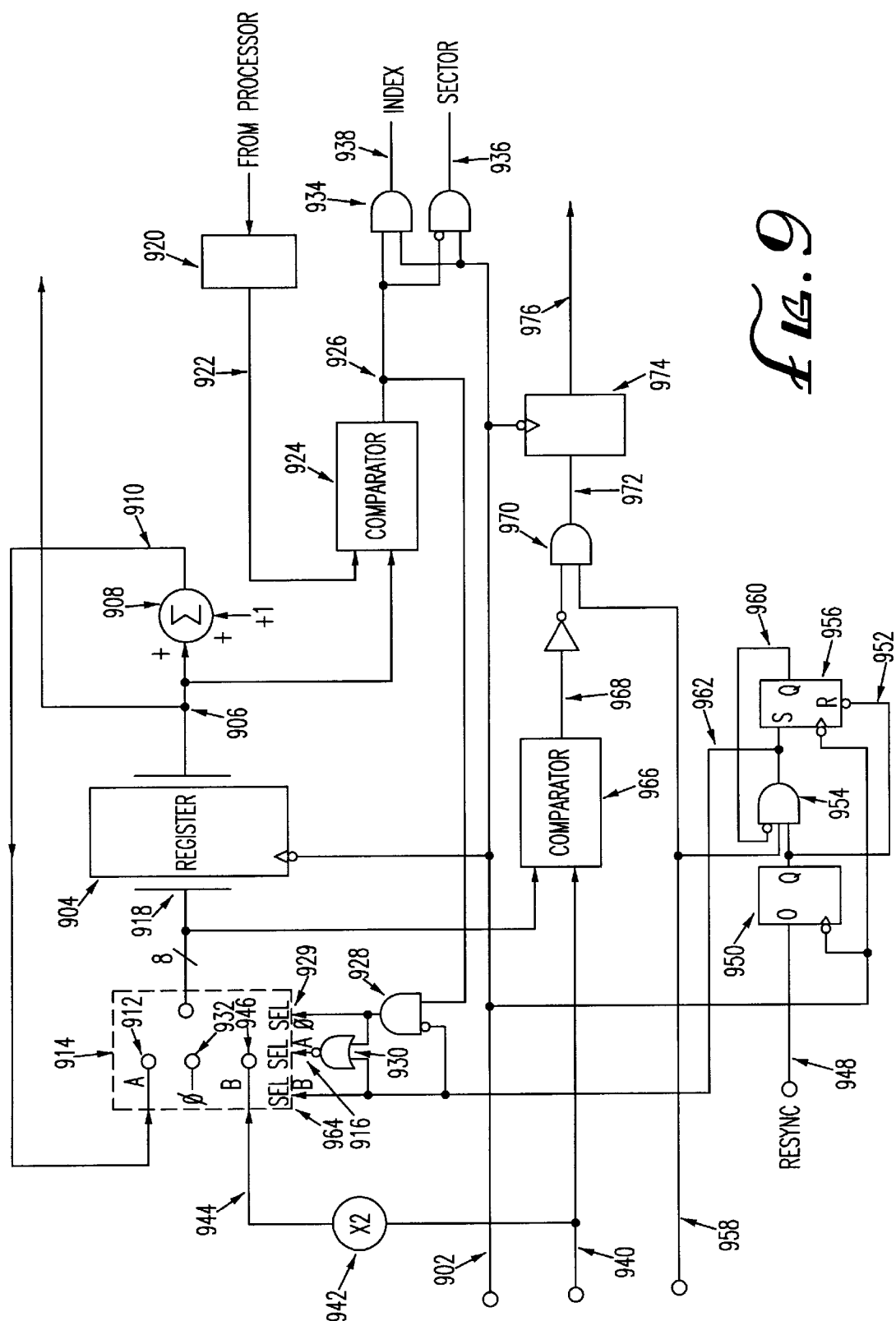
FIG. 9 is a block diagram of an index detection and rotational position sensing apparatus according to one or more aspects of the present invention.

FIG. 9 shows an apparatus for index detection and rotational-position sensing in a removable cartridge disk drive according to one or more aspects of the present invention.

In the embodiment of FIG. 9, a servo sector pulse signal 902, which in the preferred embodiment may comprise the servo sector pulse signal 544 from the Orientation Counter 542 of FIGS. 5 and 6, is provided to a clock input of a count register 904. In response to a pulse in the servo sector pulse signal 902, the count register 904 generates and outputs a current servo sector number signal 906. The current servo sector number signal 906 is provided to an incrementer 908 which increments the current servo sector number signal 906 by one to generate a next servo sector number signal 910.

The next servo sector number signal 910 is provided to an "A" input 912 of a select switch 914. So long as the count register 904 has not reached its maximum count and is not being re-synchronized, the select A input 916 of the switch 914 is activated to connect the "A" input 912 to the input 918 of the count register 904. Thus, the next servo sector number signal 910 is coupled back to the input 918 of the count register 904 to be provided as the current servo sector number signal 906 in response to the next pulse in the servo sector pulse signal 902.

The embodiment of FIG. 9 also includes a maximum servo sector register 920 which provides a maximum servo sector number signal 922. The register 920 may be loaded with a maximum servo sector number corresponding to the number of servo sectors 300, 300' recorded on a magnetic disk to be read by the removable cartridge disk drive. The maximum servo sector number may be loaded into the register 920 from a microprocessor or digital signal processor. All registers and counters are activated by the high-to-low (falling) edge of the Servo Sector Pulse signal on wire 544.

In a preferred embodiment, the maximum servo sector number is 119 corresponding to a magnetic disk with 120 servo sectors 300, 300'.

The maximum servo sector number signal 922 and the current servo sector number signal 906 are provided to a first comparator 924. The comparator 924 compares the current servo sector number with the maximum servo sector number and generates a wrap count signal 926 which becomes active whenever the current servo sector 300' is the final servo sector on a particular track 405.

The wrap count signal 926 is coupled through an AND gate 928 to a select zero input 929 of the select switch 914 and to a NOR gate 930. In response to the wrap count signal 926 going active, the select switch 914 connects the input 918 of the count register 904 to a zero position 932. In response thereto, on the next pulse in the servo sector pulse signal 902, the count register 904 resets the current servo sector number signal 906 to zero. Thus the count register 904, the incrementer 908, and the first comparator 924 together implement a servo sector counter which counts servo sectors 300, 300' in response to a servo sector pulse signal 902 and wraps at the final servo sector on a particular track 405.

The wrap count signal 926 and the servo sector pulse signal 902 also are provided to a gating circuit 934. The gating circuit 934 generates a sector signal 936 and an index signal 938 which may be provided to an interface controller in the removable cartridge disk drive to indicate each servo sector 300, 300'. The sector signal 936 follows the servo sector pulse signal 902, except that a pulse in the servo sector pulse signal is suppressed for servo sector number 0 at the start of each track 405. The index signal 938 exhibits a pulse in response to servo sector 0 at the start of each track 405.

It is necessary when attaining initial servo lockup to initialize the servo sector counter with an initial servo sector number. Re-synchronization may also be necessary during a head switch operation in the presence of circumferential skew greater than one servo sector 300, 300'. This is accomplished in the embodiment of FIG. 9 by means of the Circumferential Orientation signal 940, which in the preferred embodiment may comprise the multiplexed Coarse Position/Circumferential Orientation signal 586.

The Circumferential Orientation signal 940 is provided to a shifter 942 which multiplies by two the Circumferential Orientation value provided by the Circumferential Orientation signal to produce a detected sector number signal 944 containing a detected servo sector number. The shifter 942 is necessary because the Circumferential Orientation value is advanced by one on alternate servo sectors, and not on every sector. This is necessary because the Circumferential Orientation field 330 only appears in servo sectors 300, which alternate with servo sectors 300' on a track 405. The detected sector number signal 944 is coupled to a "B" input 946 of the select switch 914.

The following procedure is followed to re-synchronize the servo sector counter with the detected servo sector number. A re-synchronize signal 948 is provided to a flip-flop 950. The re-synchronize signal 948 is asserted in response to a command from a microprocessor or digital signal processor in the removable cartridge disk drive. When the re-synchronize signal 948 is asserted, the flip-flop 950 is toggled in response to the next pulse in the servo sector pulse signal 902.

The flip-flop output 952 is coupled to an AND gate 954. The flip-flop output 952 also is provided to a reset input of a flip-flop 956. The AND gate 954 also receives a Circumferential Orientation valid signal 958, which in the preferred embodiment may comprise the servo sector number valid signal 596, which is active whenever a valid Circumferential Orientation field 330 is detected. The AND gate 954 also receives as an inverting input the output 960 of the flip-flop 956 (which is normally inactive), whereupon AND gate 954 generates a load servo sector number signal 962.

When Circumferential Orientation valid signal 958 is active, and the flip-flop 950 is triggered, the load servo sector number signal 962 becomes active. The load servo sector number signal 962 is provided to an inverting input of the AND gate 928 to inhibit count wrap during re-synchronization. Also, the load servo sector number signal 962 is provided to the NOR gate 930 to disable the select A input 916 of the select switch 914 and thereby to disconnect the input 918 of the count register 904 from the next servo sector number signal 910 during synchronization. The load servo sector number signal 962 also is provided to a select B input 964 of the select switch 914. While the load servo sector number signal 962 is active, the select switch 914 connects the detected sector number signal 944 to the input 918 of the count register 904.

In response to the next pulse in the servo sector pulse signal 902, the count register 904 is loaded with a detected servo sector number provided by the detected sector number signal 944 derived from the Circumferential Orientation signal 940. At the same time, the second flip-flop output 960 is reset, disabling the load servo sector number signal 962. Thus, further re-synchronization is inhibited and the servo sector counter begins to free-run off of the servo sector pulse signal 902. By this procedure the servo sector counter is synchronized with a servo sector number derived from information contained in the Circumferential Orientation field 330 of a servo sector 300.

The index detection and rotational-position sensing circuit shown in FIG. 9 also checks to detect count errors in the servo sector counter. The input 918 to the count register 904 and the Circumferential Orientation signal 940 are each coupled to a second comparator 966. The comparator generates a count accuracy signal 968 which indicates whether the servo sector counter agrees with the circumferential orientation index contained in a Circumferential Orientation field 330 of a servo sector 300.

In the embodiment of FIG. 9, the count accuracy signal 968 is inverted and gated by the Circumferential Orientation valid signal 958 by means of an AND gate 970 to generate a count miscompare signal 972. The count miscompare signal 972 is coupled to a latch 974 where it is clocked in by the next pulse in the servo sector pulse signal 902. The latch 974 outputs a latched count miscompare signal 976. The latched count miscompare signal 976 may be provided to a microprocessor or digital signal processor in the removable cartridge disk drive. When the second comparator 966 detects a count mismatch, the latched count miscompare signal 976 becomes active. Thus the microprocessor or digital signal processor may disable all further writing operations to the disk, and attempt to re-synchronize the servo sector counter as discussed above.

Figure 9A:
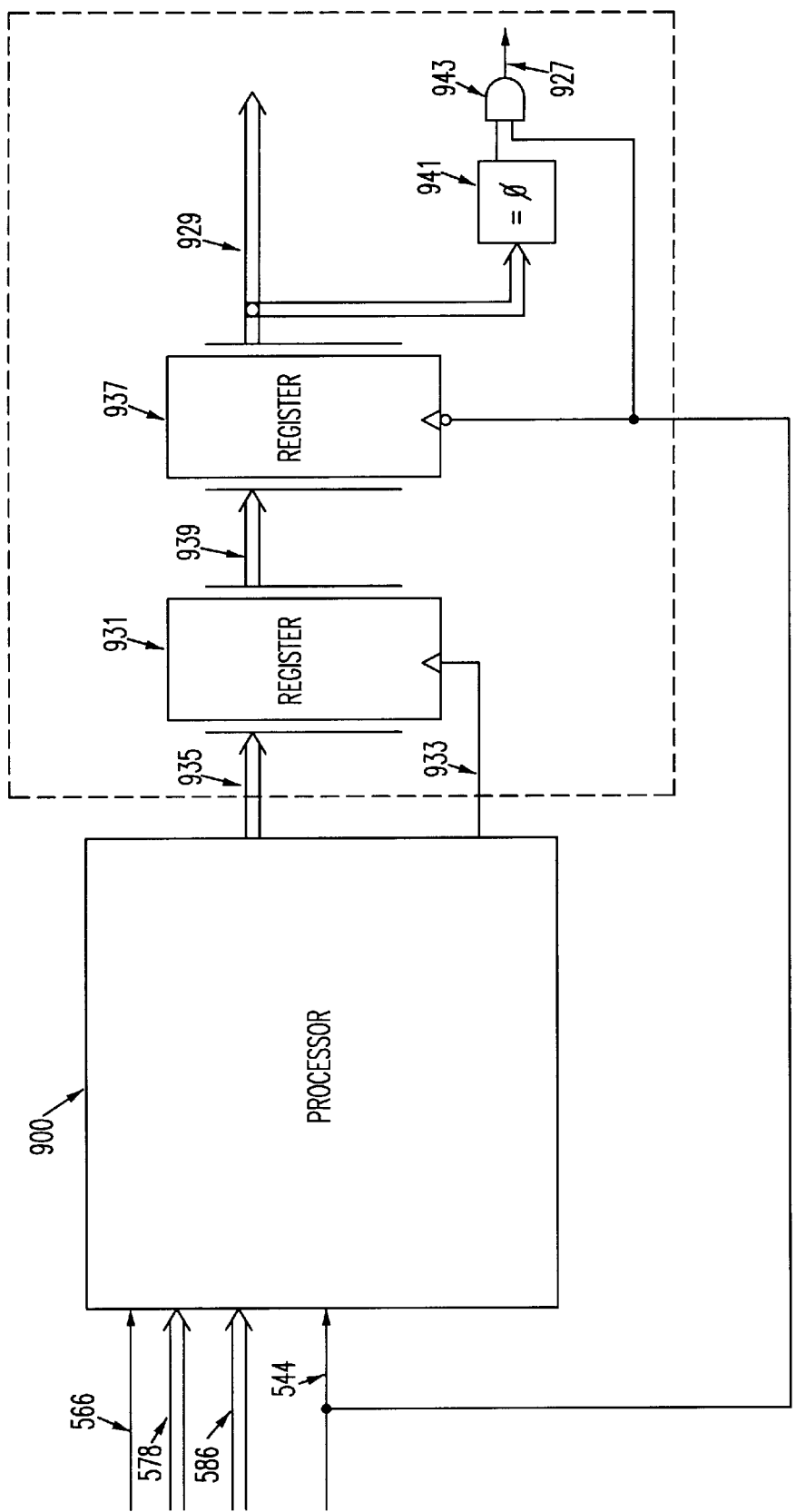
FIG. 9A shows schematically a method of producing an index pulse and an indication of circumferential orientation suitable for application to an interface controller subsystem which controls formatting of customer data on a disk surface.
Figure 9B:
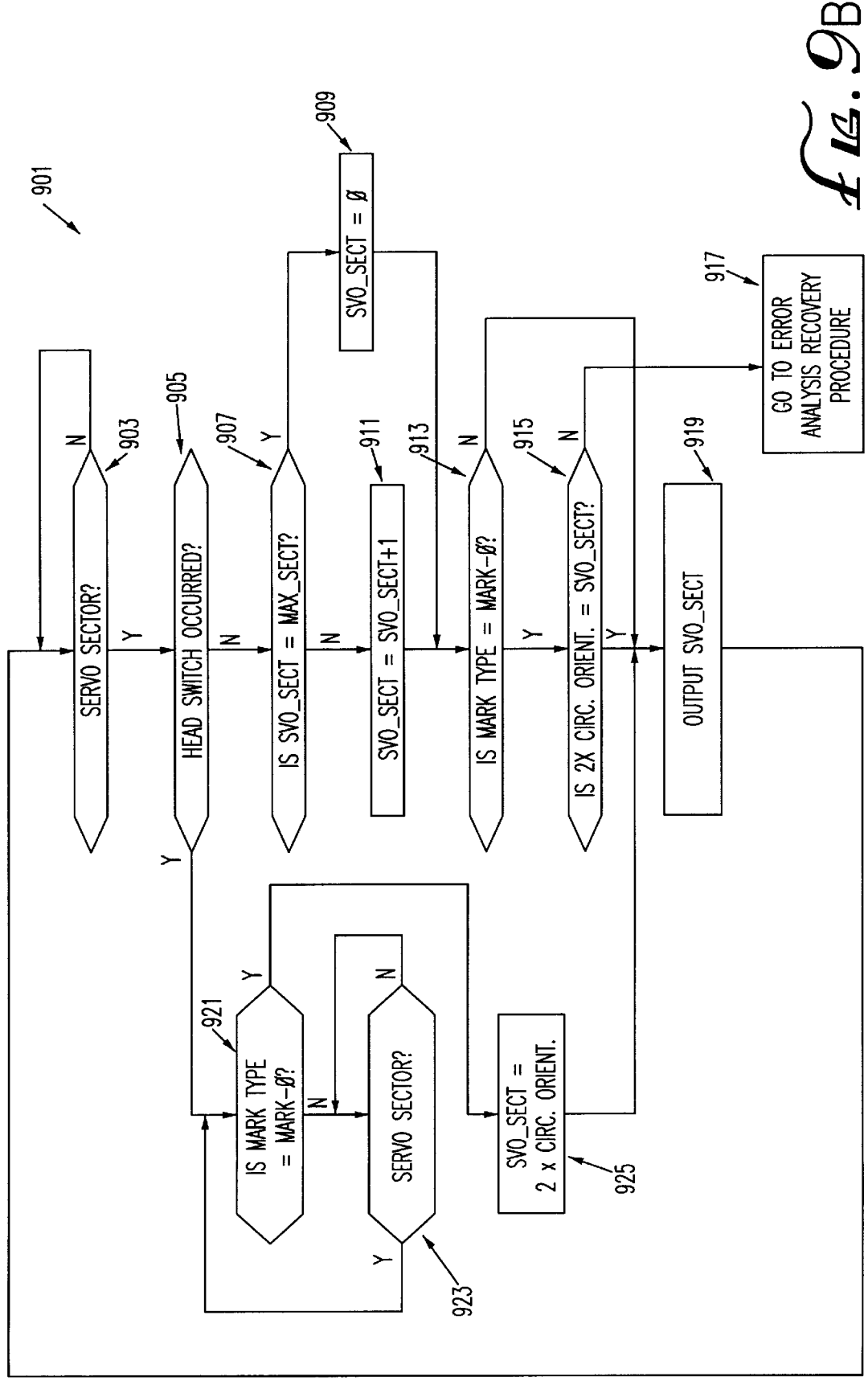
FIG. 9B is a software process flow chart showing the steps performed in the embodiment of FIG. 9A.

FIGS. 9A and 9B show the preferred method of producing an Index pulse and an indication of circumferential orientation suitable for application to an interface controller subsystem which controls formatting of customer data on the disk surface.

Wires 566, 578, 586, and 544 originate in hardware already described and are applied to processor 900. Within processor 900 a micro coded routine 901 interprets signals 566 (Mark type), 578 (Modulo position), 586 (Circumferential Orientation/Coarse Position), and 544 (Servo Sector). Signal 566 is employed by the routine to guide interpretation of buss 586 as either Coarse Position or as Circumferential Orientation. It will be understood that micro coded routine 901 forms part of a much larger control routine which performs all computations relating to servo-control operation, and which operates in time sliced fashion.

The routine uses a constant variable, max_sect, which is defined as, 1-number of servo sectors; in this implementation, max_sect=119, corresponding to 120 sectors. A working variable, svo_sect, contains the current servo sector number.

To commence the routine, a wait for Servo Sector is made in block 903, after which Circumferential Orientation on buss 586 and Mark Type on wire 566 are valid. Assuming for the moment that no head switch has intervened, the program continues through block 905 to block 907, where a test is done for maximum sector value. If the maximum value is reached, the sector count svo_sect is reset to zero in block 909; otherwise, svo_sect is incremented in block 911 to point to the next sector. Block 913 performs a check on svo_sect against the Circumferential Orientation value provided from that field of the servo sector. Recall that Circumferential Orientation is incremented on every other servo sector; this accounts for the use in block 915 of a factor of two. If the check of block 915 fails, it indicates either loss of orientation or a defective servo sector. Accordingly, for a failed check, the routine branches at 917 to an error recovery procedure. If the check is valid, control passes to block 919.

Returning now to block 905, a test is made for occurrence of an head switch; if a switch had occurred, the program branches to blocks 921 and 923. These blocks wait for a servo sector containing Circumferential Orientation information, as specified by presence of a Mark_0 mark character. Thereupon, in block 925, the svo_sect variable is forced to the value of Circumferential Orientation read from the disk; again, the factor of two is included for reasons stated above. Control then passes to block 919. Under head switch condition, there can be a significant instantaneous change in value of Circumferential Position due to inter-head circumferential skew; this is accounted for at block 925.

In block 919, the value in svo_sect is written to external hardware elements for presentation to the interface controller subsystem. From block 919, the routine looks back to block 903 to await the next servo sector pulse. A preferred implementation of the invention reserves two bits in the Circumferential Orientation field under Mark_0, for head address information. This information is checked elsewhere by micro-code, and masked out of the Circumferential Orientation field prior to its use by routine 901.

Continuing now to a description of hardware portions, these elements buffer and generate Index pulse 927 and rotational-position indication buss 929 for use by the interface controller/data formatter sections of the disk drive.

Parallel register 931 is loaded at block 919. The load operation produces a strobe pulse on wire 933 to strobe svo_sect on buss 935 into the register. From there, the data are transferred to register 937 over buss 939, whence they appear on buss 929. Registers 931 and 937 can each be eight bits in length. A double-buffered arrangement of registers 931 and 937 is used to ensure that Rotational Position information 929 and Index 927 are not subject to time jitter caused by fluctuation in timing within routine 901. Register 937 is clocked at the trailing, high-to-low edge of servo sector pulse 544. Comparator 941 detects a value of zero in register 937, and in concert with gate 943 delivers the Index pulse on wire 927.

The present invention has been set forth in the form of its preferred embodiments. It is nevertheless intended that modifications to the disclosed fault-tolerant sample-data servo pattern and detection techniques, and to the other related techniques disclosed herein, may be made by those skilled in the art without departing from the scope and spirit of the present invention. For example, the functions performed by the Orientation Counter and Demodulator Sequencer disclosed above may instead be performed in software in a Digital Signal Processor, such as Texas Instruments TMS 320C209 or the C25 LP Digital Signal Processor family, achieving the same results. Moreover, such modifications are considered to be within the purview of the appended claims.

What is claimed is:

1. A storage disk suitable for use in a disk drive with a sample-data servo system, said storage disk having a plurality of tracks with a servo pattern recorded therein, said servo pattern comprising:
    a plurality of first servo sectors, each of said first servo sectors including a first mark field with a first servo sector identifier, a circumferential orientation field which provides a unique integer value of the circumferential orientation of the disk for each of said first servo sectors, and a first track address field which provides a modulo integer track address; and
    a plurality of second servo sectors, each of said second servo sectors including a second mark field with a second servo sector identifier, each of said second servo sectors also including a coarse position field and a second track address field which together provide a full track address.

2. The magnetic recording disk of claim 1, wherein said first servo sectors alternate with said second servo sectors at regularly-spaced intervals along data tracks on the magnetic recording disk.

3. The servo pattern of claim 1, where the total length, in bits, of said circumferential orientation field and said first track address field is equal to the total length, in bits, of said coarse position field and said second track address field.

4. The servo pattern of claim 1, where the circumferential displacement from said first mark field to said circumferential orientation field is the same as the circumferential displacement from said second mark field to said coarse position field.

5. The disk drive of claim 1, wherein the storage disk is a magnetic recording disk located within a removable cartridge.

6. The disk drive of claim 1, wherein said first servo sectors alternate with said second servo sectors in said tracks.

7. A method of determining circumferential orientation in a sample-data servo system in a disk drive which reads servo sectors and data sectors recorded on the surface of a storage disk, said method comprising the steps of:
    writing a unique integer sector number in a circumferential orientation field of each of a plurality of servo sectors;
    detecting one of said servo sectors with the sample-data servo system;
    reading said unique integer sector number from said circumferential orientation field in said detected servo sector; and
    loading a servo sector counter with said unique integer sector number.

8. The method of claim 7, where said servo sectors having a circumferential orientation field comprise one half of the number of servo sectors in each track and alternate along each data track with servo sectors not having a circumferential orientation field.

9. The method of claim 7, further comprising, after the loading step, the step of multiplying said integer sector number by two to produce a detected sector number signal.

10. The method of claim 9, further comprising the steps of:
    after the writing step, writing a plurality of second servo sectors along each track in alternation with said plurality of servo sectors; and
    after the multiplying step, the steps of detecting an adjacent second servo sector during disk rotation and incrementing said detected sector number signal by one upon detection of said adjacent second servo sector.

11. The method of claim 9, further comprising, after the multiplying step, the step of comparing said detected sector number signal with said integer sector number.

12. An apparatus for identifying servo sectors on a storage disk, said apparatus comprising:
    a storage disk having a surface with a plurality of concentric data tracks and servo sectors;
    some of said servo sectors having a servo pattern recorded therein, said servo pattern including a mark field and a circumferential orientation field which provides a unique integer value of circumferential orientation;
    a read/write head disposed adjacent to said magnetic disk for reading said first and second servo sectors and providing a read data signal;
    a data detector for detecting the read data signal and providing a serial servo data signal;
    a shift register coupled to said data detector for receiving said serial servo data signal and providing a parallel servo data signal; and
    a circumferential orientation register connected to the parallel servo data signal for receiving said unique integer value of circumferential orientation after detection of said mark field.

13. The apparatus of claim 9, wherein each of said servo sectors also contains a modulo track number.

14. A storage disk suitable for use in a disk drive with a sampled-data servo system, said storage disk having a servo pattern comprising a plurality of servo sectors, each of which includes a mark field with a servo sector identifier field and a circumferential orientation field which provides a unique integer value of the circumferential orientation of the disk for each of said servo sectors.

15. A magnetic recording disk suitable for use in a disk drive with a sample-data servo system, said magnetic recording disk having concentric tracks and having a servo pattern comprising:

a plurality of first servo sectors along each track, each of said first servo sectors incorporating a first mark field having a first servo sector identifier, and a circumferential orientation field providing a unique integer value of the circumferential orientation upon the disk of said first servo sector, said circumferential orientation field starting at a first predetermined distance from said first mark field; and a plurality of second servo sectors along each track, each of said second servo sectors incorporating a second mark field having a second servo sector identifier, and track address information which provides a full track address, said track address information starting at a second predetermined distance from said second mark field, said second predetermined distance being the same as said first predetermined distance.

16. A magnetic recording disk suitable for use in a disk drive with a sample-data servo system, said magnetic recording disk having concentric tracks and having a servo pattern comprising:

a plurality of first servo sectors along each track, each of said first servo sectors incorporating a first mark field having a first servo sector identifier field and a circumferential orientation field providing a unique integer value of the circumferential orientation upon the disk of said first servo sector, said circumferential orientation field located at a position relative to said first mark field; and a plurality of second servo sectors along each track, each of said second servo sectors incorporating a second mark field having a second servo sector identifier, and track address information providing a full track address, said track address information being located in the same position relative to said second mark field as said circumferential orientation field is located relative to said first mark field.

* * * * *

UNITED STATES PATENT AND TRADEMARK OFFICE
CERTIFICATE OF CORRECTION

PATENT NO. : 6,118,603
DATED : September 12, 2000
INVENTOR(S) : Wilson et al.

It is certified that error appears in the above-identified patent and that said Letters Patent is hereby corrected as shown below:

<u>Column 18,</u>
Line 42, replace the term "said magnetic disk" with -- said storage disk --; and
Line 43, replace the term "said first and second servo sectors" with -- said servo sectors --.

Signed and Sealed this

Eighth Day of October, 2002

Attest:

Attesting Officer

JAMES E. ROGAN
*Director of the United States Patent and Trademark Office*